June 19, 1956
R. W. MIECZKOWSKI ET AL
2,750,868
AIR CONTROL APPARATUS
Filed May 26, 1950
4 Sheets-Sheet 1
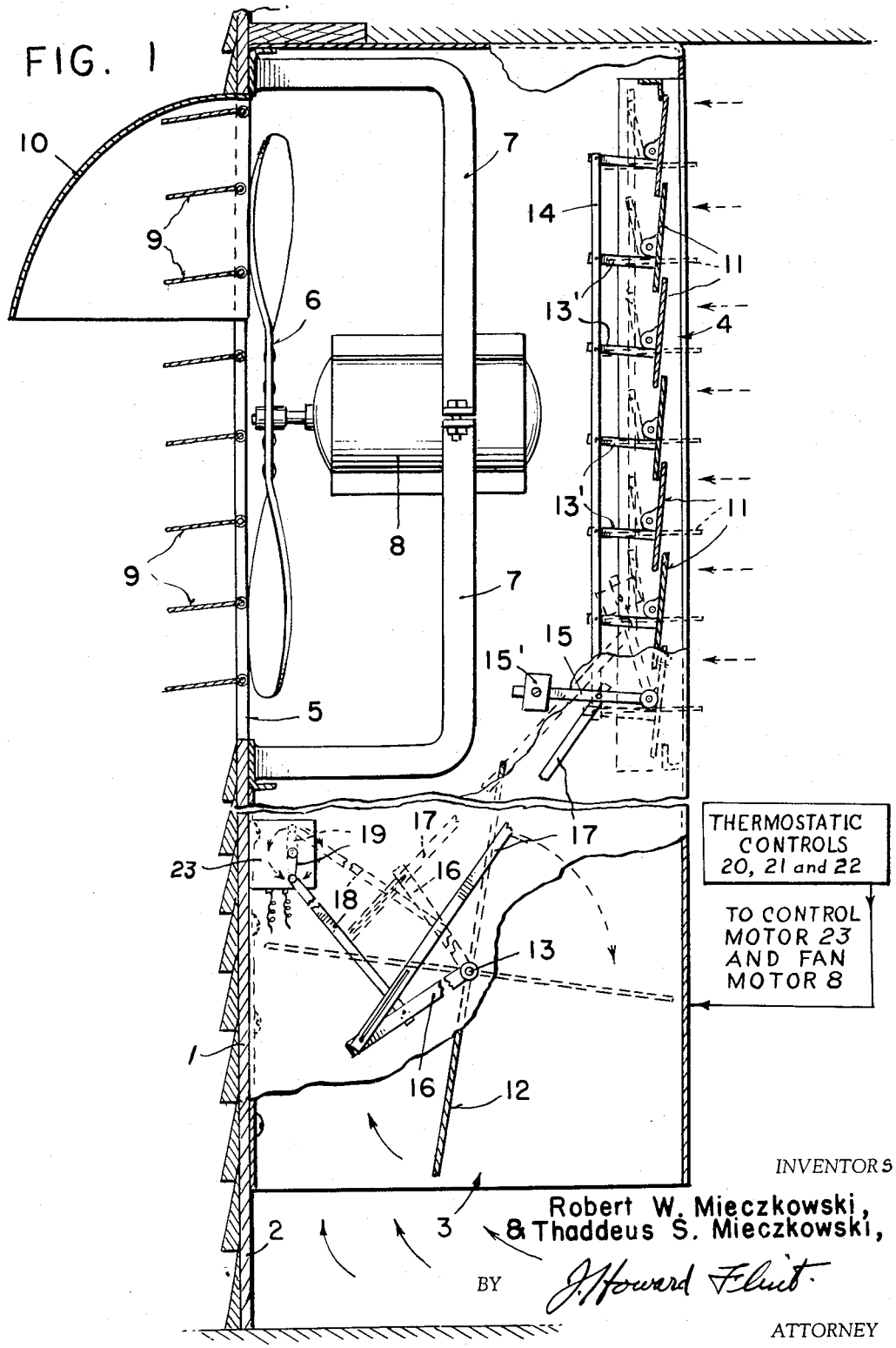
INVENTORS
Robert W. Mieczkowski,
& Thaddeus S. Mieczkowski,
BY J. Howard Flint
ATTORNEY June 19, 1956   R. W. MIECZKOWSKI ET AL   2,750,868
AIR CONTROL APPARATUS
Filed May 26, 1950   4 Sheets-Sheet 2
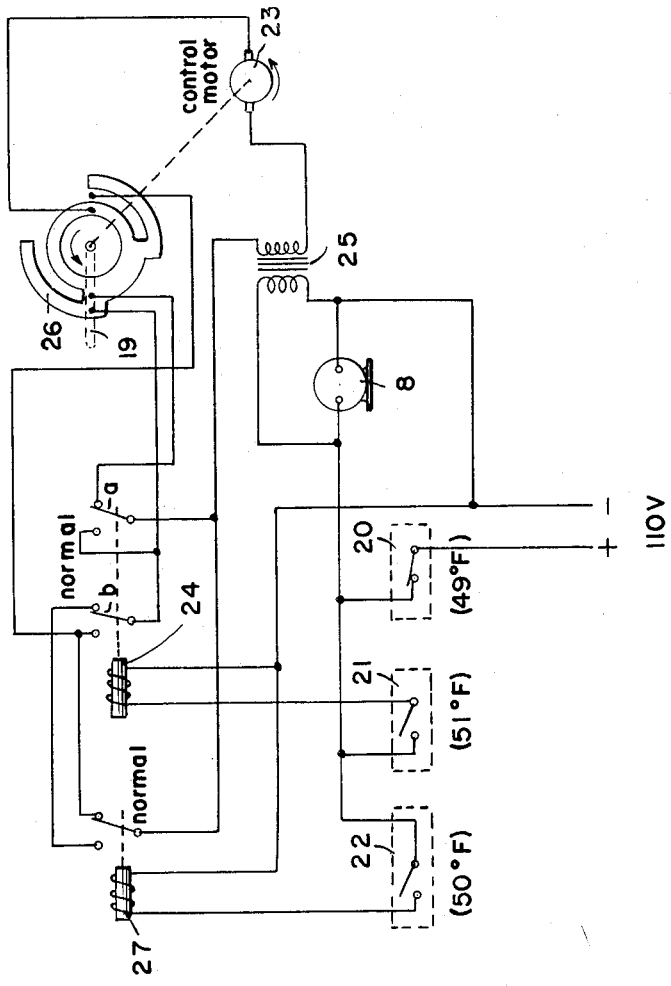
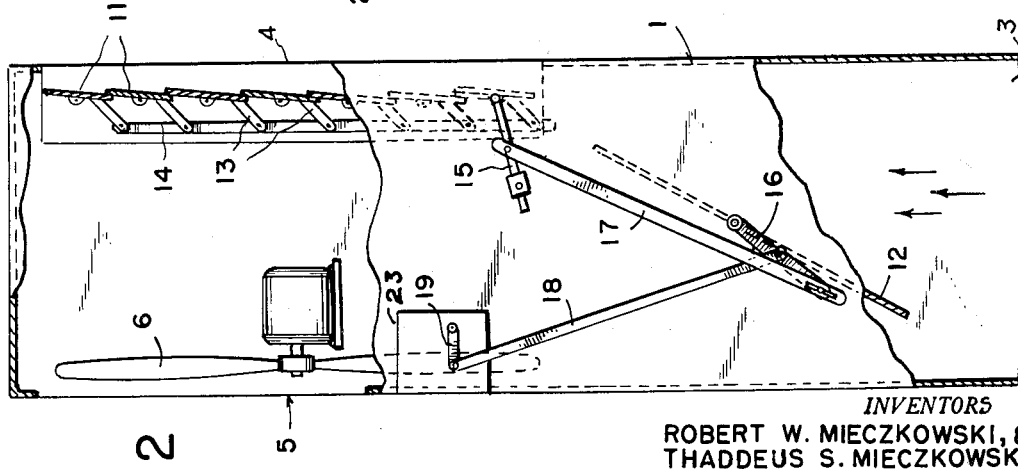
INVENTORS
ROBERT W. MIECZKOWSKI, &
THADDEUS S. MIECZKOWSKI
BY  J. Howard Flint.
ATTORNEY June 19, 1956   R. W. MIECZKOWSKI ET AL   2,750,868
AIR CONTROL APPARATUS
Filed May 26, 1950   4 Sheets-Sheet 3
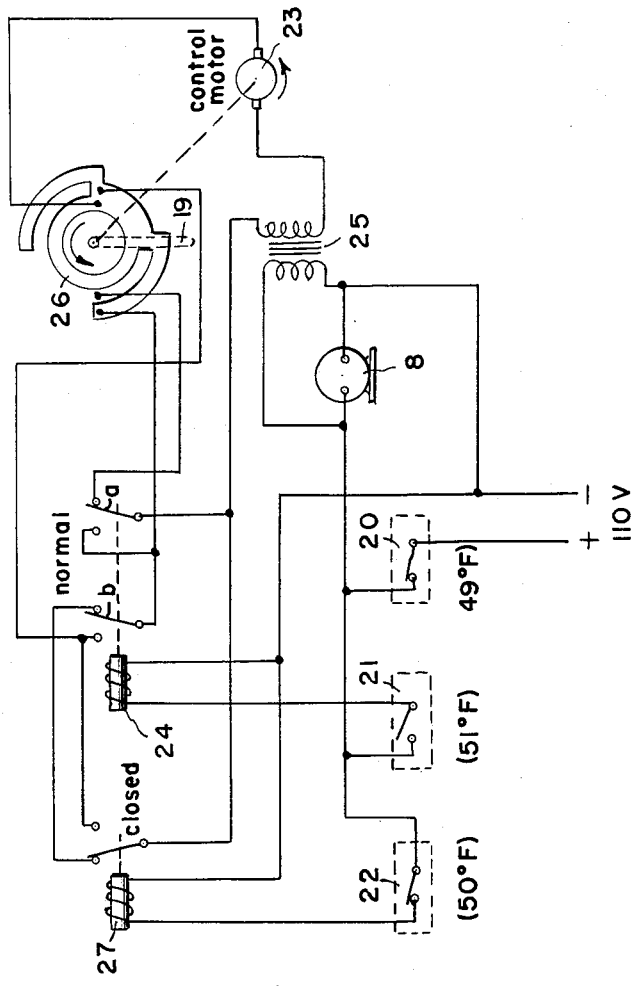
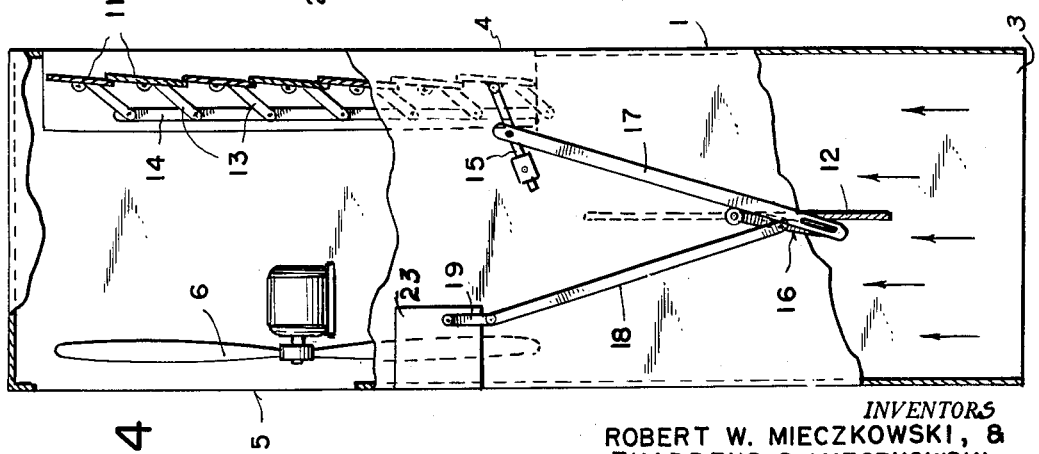
INVENTORS
ROBERT W. MIECZKOWSKI, &
THADDEUS S. MIECZKOWSKI
BY  *J. Howard Flint*
ATTORNEY June 19, 1956　　　R. W. MIECZKOWSKI ET AL　　　2,750,868
AIR CONTROL APPARATUS
Filed May 26, 1950　　　　　　　　　　　　　　　4 Sheets-Sheet 4
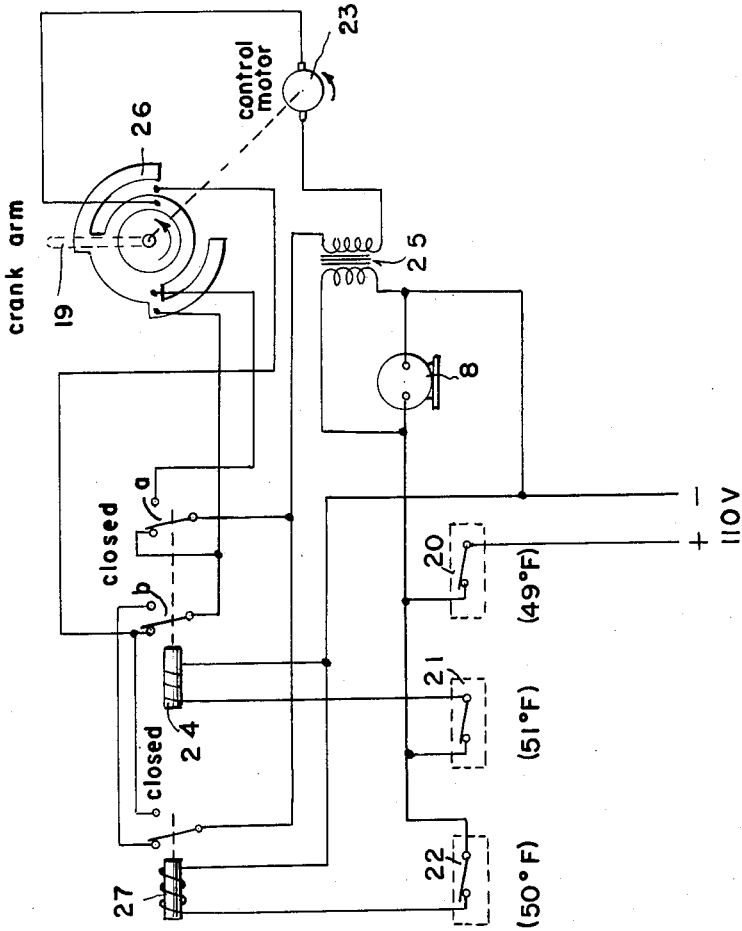
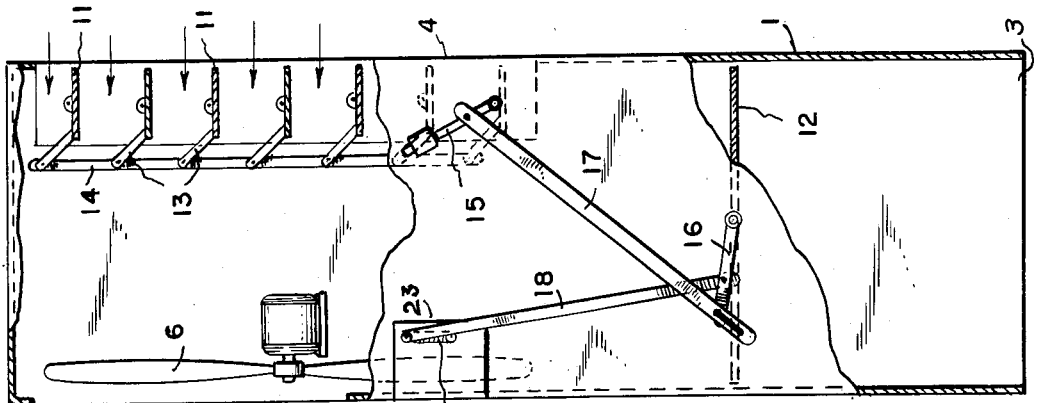
INVENTORS
ROBERT W. MIECZKOWSKI, &
THADDEUS S. MIECZKOWSKI
BY　*J. Howard Flint*
ATTORNEY

United States Patent Office 2,750,868
Patented June 19, 1956

2,750,868

AIR CONTROL APPARATUS

Robert W. Mieczkowski, Laceyville, and Thaddeus S. Mieczkowski, Skinners Eddy, Pa.

Application May 26, 1950, Serial No. 164,464

2 Claims. (Cl. 98—116)

This invention relates to conditioning the air of barns, and especially concerns apparatus to regulate qualities of the atmosphere in structures for housing animals. Keeping dairy barns comfortable is one illustrative use of this invention.

Cattle pushed to high rates of production are delicate organisms. Bred and selected to yield milk or fat or flesh in notable amounts, such animals live under rapid metabolic changes. High producers are kept for their ability to consume large amounts of feed and to convert the nutrients of that feed quickly to meat or to milk. Such animal functioning involves energy changes that yield heat and moisture at corresponding high rates. A dairy herd will quickly warm the air of its stable and bring the humidity substantially to saturation.

Cattle illustrate a type of animal that regulates its body temperature without perspiring. Cattle expel heat and moisture largely in the air that passes through their lungs, or in brief, cool themselves internally. Consequently such animals, not having the benefit of cooling by evaporation of perspiration, must encounter marked physiological burdens when the air about them becomes hot or becomes humid. The blood congests inwardly to take advantage of such removal of heat and moisture as their lungs afford. Thus, the heart of the animal must work much more to maintain proper body balances and pulmonary illnesses easily occur. It is difficult to maintain in a cow barn suitable balances of heat and of moisture and yet avoid fluctuations and drafts. Proper ventilation of bars and conditioning of the air therein are not simple and have not yet been accomplished satisfactorily. In dairy barns temperatures of about 50° F., with close tolerances, are sought.

In addition to meeting the physical or physiological demands for regulating the quality of air in a cow barn, practical problems go beyond keeping the air from being too warm or too cold or too moist or too dry. The desired results must be obtained at costs for energy that must be kept at minimum. Whatever apparatus is installed must operate day after day with low demands for power and for supervision. Such apparatus must, in the first place, be installed cheaply and require but minor change in existing structures. To be dependable, such apparatus for barns must be easily accessible, must involve low upkeep, simple parts and but little deterioration. It will be borne in mind that farm labor may have much to do with this means for regulating the quality of the atmosphere in a barn and that such labor sometimes is decidedly unskilled and inapt. Hence, desirable apparatus for air control must be simple, easy to install and to maintain, must be rugged, yet sensitive and effective.

A factor of considerable importance in conditioning barn air is to change the air as required in such a way as substantially to avoid drafts. The air changes must occur while sensitive animals remain in the barn; but currents of air are quite detrimental. Mere mixing of air is to be avoided, whether from different parts of the space being adjusted or air from outside and from inside together. This invention recognizes that heretofore this distinction from mere intermixing of air has not been perceived or followed in many arrangements.

This invention recognizes that in conditioning barn air, circumstances vary considerably and that even a given installation encounters vastly different situations from time to time. On some occasions it may be desirable to remove heat that has accumulated from the animals, but on other occasions there may be real necessity to conserve all the heat possible and yet remove moisture. Hence, versatility is required in such conditioning apparatus, as well as qualities already described.

Various objects are involved in this invention. Fundamentally the invention is to maintain, inexpensively, suitable qualities of air throughout different levels in a barn with due regard for the comfort and welfare of sensitive, high-producing animals in the barn. Correct conditions at cow height are most difficult to maintain properly, but are most sought. Avoidance of drafts is especially important. A specific object is to condition the air, with ready responsiveness to differing conditions of its temperature and of moisture. Versatility and adaptability are important. A further object is to conserve heat where necessary under various conditions. A significant purpose is to carry on desirable regulation of the barn air with only low consumption of power, and likewise with only low maintenance requirements. Other objects and advantages of this invention will appear in the following illustrative description.

The accompanying drawings show embodiments of this invention, in certain mechanical driven ventilating means, shown partly in conventionalized form of drawing, combined with thermostatic control means therefor, shown partly in conventionalized or schematic form of drawing, illustrative of the novel features set forth in the appended claims.

In the drawing, Fig. 1 shows in vertical section partially broken away, a representative eduction unit comprising certain control and operating means for upper and lower closures for regulating the air in a barn.

Figures 2, 4 and 6, show eduction units, similarly to Figure 1, but respectively depicting the control and operating means in different positions mechanically corresponding to different settings of their thermostatic control means. Figures 3, 5 and 7 show in conventionalized diagrammatic form the thermostatic control means at different settings or temperature responses corresponding respectively to Figs. 2, 4 and 6.

Referring more particularly to the illustrative embodiment of this invention shown in Fig. 1, the apparatus includes an elongated duct 1 to be mounted vertically on some interior support. Preferably this unit is mounted with its top at the stable ceiling near the joists. As shown, this conduit is preferably of rectangular cross-section for firm attachment by simple screws against the inner side 2 of a barn. This conduit or duct 1 is shown with opening 3 at the bottom and closed at the top. But a pair of openings or substantial ports is provided in the sides near the top, as for example air inlet opening 4 in the upper inner face of duct 1 and air outlet opening 5 in the outer fact of the duct. Preferably air can flow across the duct near its top. The side inlet port 4 is of about the same net area as results in outlet port 5 when an eduction fan 6 is mounted in port 5; inlet port 4 is of greater net area than bottom duct inlet 3. This provides suitable balances of air pressures during operation. In the top ports are fitted shutters, preferably mounted horizontally.

Eduction or exhaust fan 6 is mounted by its housing 7 just inside the air outlet 5 so as to draw air out from the duct. This fan is powered by a motor 8 through either direct or belt coupling.

Some advantages are gained by light, loosely hung shutters outside fan 6, though this invention is not limited to shutters so located. For example, shutters 9 in the outlet are hinged loosely at their bases so as normally to fall shut by gravity and close the opening. These shutters 9 are light weight; however, so that even moderate outward flow of air can swing the shutter out and open to some extent. The shutters 9 swing open according to the force of the outgoing current of air, but drop back of their own weight as this current diminishes. Thus shutters 9 close the air outlet 5 against rain or snow or also against what might otherwise be incoming drafts of air. When outlet 5 is closed there is no opening from outside into the duct 1.

Over the outside of air outlet 5 is placed a hood 10. Hood 10 curves downwardly to deflect the uppermost and oftentimes warmest zone of air downwardly, to some extent tending to minimize back pressure and make the fan load tend to be uniform rather than erratic.

Referring further to the air duct 1 that is formed across its top so that air can flow across the duct from inner inlet port to outer outlet port near the top, the duct further being open at its bottom, the side air inlet opening 4 across from outlet shutters 9 is provided with a gang of shutters 11 to open or close the inlet. The open bottom of duct 1 is provided with closure means to control air flow and to prevent backdraft, as shutter closure or simple damper 12 to open or close the duct bottom.

As shown, a damper 12, fastened on a horizontal shaft 13 that is mounted across duct 1 near the bottom, can be rotated to full open position or to partially open positions in the flue.

In the gang of shutters 11 in the side inlet 4, each shutter is hinged near its middle to the duct 1. To each shutter is fastened an arm 13' that extends inwardly from near the hinge and is pinned loosely to a common, vertical connecting rod 14. Thus vertical movement of rod 14 pulls pinned arm 13' up or pushes pinned arm 13' down to pivot shutters 11 respectively to open or close side air inlet 4 in a plurality of individual air paths.

Fastened to upper shutters 11 through a shutter pivot and pinned arms 13' with their common connecting rod 14 is a balancing arm 15. Arm 15 is simply fastened to one of the shutters 11; for example is secured to the center of lower-most shutter 11. Also, fastened to any convenient portion of each individual shutter member 11 is an arm 13', each of which at its opposite end is loosely pinned to a common connecting rod 14. Thus shutters 11 act as a gang damper. Arm 15, bearing adjustable counterweight 15' near its free end, is pivotally pinned to link arm 17. Thus arm 17 moving upward moves arm 15 upward and so tilts upward the individual shutter 11 to which arm 15 is fastened. This in turn tilts or rotates its link arm 13' that is pivoted to connecting arm 14. This lifting motion raises common connecting rod 14 upward. Rod 14 being likewise connected through an arm 13' to each shutter raises all the shutters 11 as a gang. The closed shutters 11, vertical when closed, are thus tilted in open, or horizontal, position on their individual pivots. Balancing arm 15 carries counterweight 15' so as normally to bias shutters 11 to closed position, though other biasing means such as a spring or as weights differently arranged may be used.

Extending from lower damper 12 at about 120° from its axis, for example, is an arm 16 fixed to rotate with the damper 12. Extending between damper arm 16 and counterweight arm 15 is a slotted connecting crank arm 17, which links damper 12 and shutters 11 together. The manner of this linkage as shown is such that damper 12 and shutters 11 operate in successive steps. The linkage closes the damper at the bottom of the duct before opening the shutters near the top. Thus, as shown, damper arm 16 is fixed to rotate with damper 12 and projects from the plane of the damper. Pivoted loosely at some convenient intermediate point on damper arm 16 is an actuating arm 18 which is also pinned loosely to an arm 19 driven by a motor 23. Pivoted loosely near the outer end of damper arm 16 is crank arm 17, which is shown with slot and pin connection to arm 16. This crank arm 17 at its upper end is pivoted loosely on counterweight arm 15. It will be evident that the actuating motor-driven crank 19 will rotate in a circle from one position to another, while moved thereby damper arm 16 correspondingly rotates and thus rotates damper 12. Counterweight arm 15 and shutter connector arm 14 are caused by their relation to damper arm 16 through slotted arm 17 to reciprocate up and down when arm 16 rotates along the upper part of its arc, arm 14 reaching its uppermost position as motor arm 19 reaches its uppermost position.

The damper and shutter combination is operated by motor-driven crank 19 conveniently affixed to the inner side of the barn or inside the duct 1 as the case may be. This drive is actuated through thermostatic switches adapted to energize the motor 23 to different positions, for example, in steps through contacts and switches that admit power to the motor in response to thermostat relay control suitably placed in the barn. Fig. 1 illustrates conventionally a combined arrangement of three separate thermostats, 20, 21 and 22 which preferably are placed side by side at about the height of a cow's head, and are connected conventionally with educt fan motor 8 and control motor 23 for control thereof in accordance with temperature response of the respective thermostats. Each in turn as it operates throws the motor into rotation to move crank 19 for a corresponding portion of a circle. Thus the positions of damper 12 and shutters 11 depend on which thermostat switches are operating. With suitable relays these thermostats may have any requisite sensitivity. To illustrate difficulties of the present problems, and to give examples of preferred sensitivity of thermostats, it may be noted that extreme limits of temperature at cow height should be between 45° and 55° F. The educt fan should operate with bottom duct closure at least partially open between 48° and 52° F. and being wide open between 50° and 52° F. At about 52° F. air intake shifts to the upper shutters 11. These are illustrative examples. Other examples are explained in connection with explanation of conventional thermostatic temperature-responsive means to operate control motors.

Figs. 2, 4 and 6 show in similar manner to Fig. 1 and in slight and minor modifications thereof a ventilating duct 1 containing at its top motor-driven educt fan 6 (the motor thereof being identified in Figs. 3, 5 and 7 as motor 8) across the duct from gang of shutters 11 that admit or exclude inlet air. The duct 1, open at the bottom, contains control damper 12 pivotally mounted therein to rotate to open or closed or partially open positions with respect to the duct. This rotation is effected by rotation of a crank arm 16 affixed to the center of damper 12. Crank arm 16 is shown driven by an arm 18 which is pivotally fastened at one end to an intermediate portion of arm 16 and at the other end to a crank arm 19 connected to a control motor 23. Fastened to outer end of arm 16 by pin and slot connection is an arm 17, which at its upper end is pivotally connected to counterweighted arm 15. This through pivoted intermediate connections effects vertical reciprocation of an arm 14 adapted through links to open and close the gang of pivoted upper shutters 11. These in substance are means previously described with respect to Figure 1, here repeated for identification in Figures 2, 4 and 6. Various positions of these keying operating means shown in these figures are correlated with corresponding conditions of the thermostatic control means set out in conventional form in Figures 3, 5 and 7.

Figures 3, 5 and 7 illustrate for the purpose of explanation conventional thermostatic motor control means, shown diagrammatically in Figure 1, to control movement of educt fan 6 and of the means shown to operate upper and lower air inlet dampers in the keyed relationship herein described.

For example, Fig. 3, correlated with Fig. 2, shows a primary electric line containing in conventionalized form a thermostat 20 (termed 49° F.), a thermostat 22 (termed 50° F.) and a thermostat 21 (termed 51° F.). These include a relay 27 with single pole double throw switch and a relay 24 with double pole double throw switch. Also, in this line is a motor 8 for educt fan 6. A transformer 25 associates this primary line with a secondary line that contains a control motor 23 to operate the damper control means by rotating an arm 19. Control motor 23 contains conventionally a slip ring 26 adapted to serve its normal function as the motor rotates to bring several switch connections into and out of the motor circuit in sequence according to arrangements known of themselves to those skilled in the art. Figure 3 shows slip ring 26 conventionally with control motor 23 and with its respective switch connections and also indicates appropriate position of crank arm 19. Figure 3 further shows this secondary circuit through these respective switch points to relay switches 24 and 27. Figure 5 shows the same elements as already described for Figure 3, but with these electrical and thermostat elements correlated with the position of damper control means of Figure 4. Figure 7 shows these same electrical and thermostat elements correlated with the position of damper control means of Figure 6.

For preliminary identification, it may be observed, for example in Figure 3, that primary current flows through closed thermostat 20, through fan motor 8 and through transformer 25; that the secondary circuit from transformer 25 includes the control motor 23 and slip ring 26 thereof with switch points appropriately connecting the slip ring to the thermostat relay switches 24 and 27. The particular settings or positions of these parts will be described with respect to the Figs. 3, 5 and 7 in correlation to a complete cycle of the keying arrangements and positions of the ventilating control and operating means illustrated in corresponding Figs. 2, 4 and 6.

In order to illustrate a specific embodiment of this invention in which thermostatic control elements per se are conventional, and in order to follow this specific illustration through an entire cycle, the following detailed explanation is given with reference to Figs. 1–7, inclusive.

Air duct 1 is mounted vertically on the interior of a stable wall so that educt fan 6 at the upper part of duct 1 draws air out of the stable and exhausts to the outside through outlet port 5. This mounting is such that the top or closed end of this unit may be near or at the ceiling while bottom inlet port 3 of the unit is at an elevation clear of the stable floor. Upper inlet port 4 is in a wall of the duct near fan 6. Thus fan 6 may draw air from the stable either through the bottom of the duct from port 3 or across the top from port 4. This apparatus operates as further described, its keying of damper means resulting in conditioning or ventilating the atmosphere in the stable but without causing substantial temperature differences or variations, or drafts in the stable.

For illustration, the duct elements are taken beginning as shown in Fig. 2 with thermostat connections as shown in Fig. 3. The duct bottom damper 12 is in partially open or inclined position, with the gang of shutters 11 in upper port 4 closed. Control-motor crank arm 19 is shown conveniently as horizontal at nine o'clock position. Thus the air inlets for fan 6 are shown choked to some low capacity, as corresponds to a low temperature starting position. At the same time, thermostat 20, of conventional structure, is shown closed (for illustration indicated in Fig. 3 as "49° F.") and in a circuit as shown in Fig. 3 (of a conventional damper system of which many are on the market) and now more fully described (thermostats 22—"50° F."—and 21—"51° F."—now being open). The closed (or energized) condition of thermostat 20 effective at the low temperature is shown conveniently as in circuit from conventional 110 volt source with, and energizing, educt fan motor 8, and also transformer 25. The control motor 23 that actuates crank arm 19 normally has one side energized directly from the secondary of transformer 25. The other side is energized through a relay 24 switch leg (a) to the left and center segments of control motor slip ring 26. Motor 23, viewed from position showing it to move counter-clockwise cannot move farther in the counterclockwise direction illustrated without breaking its contact at the left central segment of slip ring 26 and leaving motor 23 in the position illustrated in Figs. 2 and 3. Other elements of this circuit will be described as they are brought into play from the positions shown in Fig. 3.

Next, a temperature rise occurs in the stable so that, as shown in Fig. 5, the thermostat 22 (indicated as "50° F.") now closes also (with thermostat 20 remaining closed). This energizes relay 27 to close its contact that is in the secondary circuit with control motor slip ring 26 through switch leg (b) of the relay 24. Thus control motor 23 again is energized, this time through the outer leg segment of slip ring 26 as shown. Thus energized, motor 23 and its crank arm 19 rotate 90° counterclockwise from their position in Fig. 3, so that any further rotation breaks this circuit and stops control motor 23 and arm 19. In this position, as shown in Fig. 4, arm 19 and its intermediate control means have brought damper 12 at the bottom of duct 1 to vertical or wide-open position. In this illustration, arm 19 moved counterclockwise to down or six o'clock position pushing link 18 down. This in turn pushed link 16 counterclockwise, thus rotating damper 12 on its axis to vertical or wide-open position. In this interval, slotted link arm 17 simply idled on its pin and slot connection to link 16 and upper gang shutters remained closed. Thus all air coming from the stable is drawn through bottom port 3, at full capacity of this port. It may be noted, however, that this is somewhat less than full capacity of educt fan 6 because the damper 12 and the walls and angles of duct 1 and consequent cross-currents in the air stream itself do impose certain impedance to the amount of air now being taken through duct 1. This residual capacity, however, is an advantage of this invention, taking a limited quantity of air, less than full capacity of fan 6 but only from the bottom of the stable, at this intermediate stage, yet taking more than at the initial low temperature stage.

Subsequently, there may be a condition in the stable when the heat input is more than is being cared for by these stages, just described. The result is that the stable temperature rises to some undesirable degree. There the third thermostat operation comes into play. This is designated in the illustration in Fig. 7 as "51° F.," when the third thermostat 21 closes, with thermostats 20 and 22 remaining closed.

Closing of this highest temperature thermostat 21 energizes relay 24 and thus moves its double pole switch to close to the left, Fig. 7. Now control motor 23 is energized in the secondary circuit, first (Fig. 7) through switch arms (a) then (b) of relay 24 to the right and center segments of slip ring 26 (see Fig. 5 showing slip ring 26 about to enter this third thermostat control); then (after 90°) through switch arm (a) (Fig. 7) to the left and center segments of slip ring 26 as these pick up the circuit, until control motor 23 with its slip ring 26 has continued its counterclockwise turn 180° (from Fig. 5). Any further turning from the conditions shown in Fig. 7 stops control motor 23.

The mechanical effect of this third thermostat control operation may be seen from Fig. 6. Crank arm 19 of control motor 23 moved counterclockwise 180° (from Fig. 4) to an upper vertical or twelve o'clock position from its down or six o'clock position (of Fig. 4). This movement of arm 19 pulled up arm 16 through intermediate link 18, thus turning bottom damper 12, fastened to rotate by arm 16, to horizontal or closed position. During this operation, arm 16 rises in the slotted intermediate connecting link 17 to push up link 17. Link 17 moving up acts to rotate counterweighted arm 15 upward and thus rotate its associated gang of shutters 11 to horizontal position, Fig. 6. This rotation of shutters 11 occurs on their individual pivots by reason of their individual connecting links to their common connecting rod 14, so that as arm 15 rotates bottom shutter 11 to horizontal position, it rotates associated shutters 11 likewise. In this horizontal position, shutters 11 are wide open. Now air enters duct 1 at the top but not at the bottom, for lower damper 12 is closed. This is the condition when temperature had built up, or heat was being increased, in the stable more than operations through the bottom of duct 1 could care for. Those lower duct operations were drawing off essentially cooler air. Now the upper duct operation, based on undesirably high heat conditions in the stable, takes over and the hotter upper air is drawn off directly through shutters 11. In this phase, the air flows as directly as possible from upper port 4 through educt fan 6. Thus the capacity of fan 6 is utilized more fully than when the air was drawn through bottom port 3 and the lower duct passages. This hotter air is drawn out as quickly as possible, and because it is hotter it carries out the heat with least wasting of volume and least causing of drafts; likewise with least mixing of the hotter air with the other air and consequent release of moisture to cause dampness. These and other advantages of this invention are brought about by this opening of the upper port 4 fully when the operations through lower port 3 become inadequate and that port is closed.

Now the reversing of conditions just described can be followed in reverse order in the illustration given in Figs. 2–7. When the undesirably high heat conditions in the barn have been alleviated, appropriate drop in temperature causes thermostat 21 to open. Then control motor 23 moves from its position of Figs. 6 and 7 until its position of Figs. 4 and 5 exist. That is, relay 24 immediately returns to normal (Fig. 5), so that its two arms (a) and (b) are on their original contacts, shown right as in Fig. 5, as relays conventionally do. The secondary circuit through (normal) switch arm (a) of relay 24 (Fig. 5) to the right flows (through slip ring 26 left in position as, or just after, that shown in Fig. 7) through the central segments of slip ring 26, while control motor 23 moves counterclockwise, first 90°. The circuit continues from motor 23 through the central segment of slip ring 26 but now through outer left segment thereof as that moves into contact and through (normal) switch arm (b) of relay 24 at the right and through the (closed) switch arm of relay 27, as crank arm 19 of control motor 23 moves additional 90°, or to down or six o'clock position (Figs. 4 and 5). (This is 180° from Figs. 7 and 6). This has closed the gang of shutters 11 over upper port 4 and left bottom damper 12 of duct 1 wide open. Thus air from the floor is being drawn into the bottom of the duct and through wide open damper 12.

Now if the temperature falls further in the stable, the intermediate thermostat 22 opens. This condition of the thermostat and control motor circuit is shown in Fig. 3. Both thermostats 22 and 21 are now open, with thermostat 20 closed. The control motor slip ring 26 starts from where it was left, as shown in Fig. 5. When the thermostat 22 opens its circuit, the switch arm of relay 27 returns to its normal position, as relays conventionally do, shown in Fig. 3 in contact at the right. Applying this to the slip ring, starting from the position shown in Fig. 5, the secondary circuit of control motor 23 flows through the switch arm (right) of relay 27 and through the right outer segment of slip ring 26 to the central segment as the motor 23 turns its first 90° counterclockwise; the circuit then shifts to the left outer segment for a second 90°, and then to the left central segment for the third 90°, or total of 270° to the slip ring 26 position shown in Fig. 3. Any further movement of the slip ring opens this circuit and stops control motor 23. This leaves crank arm 19 in horizontal position at nine o'clock position and damper 12 in inclined position, as indicated in Fig. 2.

Educt fan motor 8 continues to operate, even though control motor 23 has stopped, through closed thermostat 20 until such time as the temperature lowers enough to open thermostat 20 again. This stops fan 6. At that time bottom damper 12 is partially open but educt fan is not operating. Subsequently, if the temperature rises, thermostat 20 closes and starts educt fan motor 8 again. This is the condition from which this particular illustration started, with bottom damper 12 partially open and educt fan 6 operating. Thus a complete upward and downward cycle has been illustrated, though it is clear that partial or lesser cycles within the entire range will function likewise according to temperature demand. Such control means, thermally responsive at various temperatures, is applied in this invention to carry out the operations described, in which barn conditions are regulated by means first to draw air from lower levels at various rates or degrees of throttling and then if heat conditions become too severe to cease this lower level activity to shift to vigorous withdrawal from upper or hotter levels. This introduces many advantages, including heat conservation in barns, lowered energy consumption of operating means, positive and flexible regulation of barn conditions, avoidance of moisture damage and avoidance of drafts. It will now be apparent to those skilled in the art that many alterations and variants of this invention may be made within the appended claims.

Operation and benefits of this combination take advantage of slight differences in temperature at the desired level in a stable but tend to minimize those differences and to avoid drafts. The uppermost layer of air naturally is warmest yet it oftentimes must conserve and utilize the animal heat it accumulates. Naturally, also, this warmest portion of air has the greatest moisture-retaining capacity. But the lowest portions of air near the floor naturally tend to be coolest and also have the least moisture-retaining capacity. As a matter of fact, this lowermost air often is damp and easily lowered below its dew-point. This may occur from the chill and moistening effect of the floor, and from the animals on the floor. Not so clearly recognized, but yet a fruitful source of moisture accumulation, is intermingling of the moist upper layers of air with the damp lower layers. Moisture from stable air causes stable gases to become acid. Where electrical installations are exposed to barn dampness, the installations deteriorate rapidly. Of course, moisture and drafts of themselves are undesirable where animals are stabled. A considerable rate of removal of heat and of moisture must be carried on in a barn as well as considerable renewal of air.

Under the present invention, air and moisture are removed with inappreciable drafts or commingling of air currents and with but minor power requirements. Any tendency to power demand on the exhaust fan because of turbulence is minimized so that fan power as well as vibration are minimized.

If a final stage of air removal is required, this is accomplished entirely through the upper air inlet 5. The high temperature thermostat closes and energizes the control motor 23 so that arm 19 now rotates in the range of its highest arc; for example, to upper vertical position as illustrated in the figure. Thus the control linkages close bottom damper 12 and open the gang of shutters 11. Air inlet 4 opposite the exhaust fan and outlet 5 now provide the path for air outlet. This inlet 4 in duct 1 is near the ceiling so as to withdraw the warmest air. Preferably the entire air flow is substantially direct to the exhaust fan. The free-swinging shutters 9 outside the fan outlet minimize backdraft. The volume of air and potential drafts thus are minimized for a given cooling effect. Also, commingling is avoided of air having substantially different moisture contents, with attendant moisture deposit. These and other advantages occur both in the barn space and in the duct itself. The direct path for air outlet without mingling air currents also avoids turbulence and minimizes loss of energy and vibration at the fan.

As the temperature falls, the control motor 23 will be energized by the thermostats acting in reverse order on the proper contacts so the motor continues its step-wise rotation. Correspondingly, the upper shutters 11 first are closed by the lowering of link arm 17 and counterweight 15¹ while lower damper 12 moves to wide open position. Then on further cooling the thermostats continue in reverse order, first bringing the damper to partially open position. When the lowest temperature is reached, the fan stops. Thus the cycle or any required part of it at whatever level is operated in sensitive and efficient response to conditions. Drafts are avoided whether the unit is operating or not.

A noteworthy advantage of this combination is the tendency to minimize moisture condensation in or on the duct or its parts. This is partly because the apparatus mounted inside the barn acquires the temperature of the nearby air and further operates without bringing moist air into contact with colder material or zones.

It will be recognized from this description that this invention may be modified within the scope of the appended claims. For example, other structures than barns strictly-speaking, containing other animals than cattle may be ventilated and conditioned. Various detailed forms and positions of thermostats, motors, connections, fans, shutters and control elements will now be evident to those skilled in the art. This invention has been illustrated with reference to specific embodiments and forms as best contemplated in accordance with the patent statutes.

What is claimed is:

1. Apparatus for controlling the quality of air in a stable, comprising a vertical air duct adapted to be mounted on a wall of the stable, said duct having a closed top, an outlet opening in one of its side walls near the top of the duct to register with a corresponding opening in said stable wall and communicating with the atmosphere, an upper opening in a side wall of the duct adjacent the outlet opening for admitting air from the upper portion of the stable, said duct being open at the bottom to communicate with the stable for admitting air from the lower portion of said stable, an exhaust fan mounted in the aforesaid outlet opening, a plurality of shutters pivotally mounted in the upper opening, means biasing said shutters to closed position, a damper pivotally mounted in the lower portion of said duct intermediate the upper openings and the bottom opening of the duct, a linkage including a lost-motion means interconnecting said shutters and said damper, whereby when the damper is in a closed position the shutters are in an open position and when the damper is in a partly closed or fully open position the shutters will remain in their closed position, motor means for actuating said linkage, an electrical system including a plurality of thermostatic means for controlling said motor means and said fan, whereby on rise in temperature to a predetermined value in said stable the thermostatic means will close a first circuit of said system to operate said fan and to leave said damper in a partly closed position and said shutters in a closed position, and whereby on further rise in temperature to another predetermined value said thermostatic means will close an additional circuit to operate the motor means so as to move the damper from its partly closed position to a fully open position and then stop with the shutters remaining in the closed position, and whereby on still further rise in temperature said thermostatic means will close a third circuit to operate the motor means so as to move the damper to a fully closed position and said shutters to a fully open position to remove air only from the upper portion of the stable while preventing the flow of air longitudinally from the bottom of the duct.

2. Apparatus for controlling the quality of air in a stable, comprising a vertical air duct adapted to be mounted on a wall of the stable, said duct having a closed top, an outlet opening in one of its side walls near the top of the duct to register with a corresponding opening in said stable wall and communicating with the atmosphere, an upper opening in a side wall of the duct adjacent the outlet opening for admitting air from the upper portion of the stable, said duct being open at the bottom to communicate with the stable for admitting air from the lower portion of said stable, an exhaust fan mounted in the aforesaid outlet opening, a plurality of shutters pivotally mounted in the upper opening, means biasing said shutters to closed position, a damper pivotally mounted in the lower portion of said duct intermediate the upper openings and the bottom opening of the duct, a linkage including a lost-motion means interconnecting said shutters and said damper whereby when said shutters are in an open position the damper will be in a closed position and when the damper is in a partly closed or fully open position the shutters will remain in their closed position, motor means for actuating said linkage, an electrical system including a plurality of thermostatic means responsive to predetermined changes of temperature in the stable for actuating said motor means to operate said linkage and for actuating said fan, said thermostatic means being responsive to a first predetermined temperature to cause actuation of said fan with the damper in a partly closed position and said shutters in closed position, and being responsive to a predetermined increase in temperature to cause the damper to move to a wide open position with the shutters closed, and being responsive to a further increase in temperature to cause the damper to move to closed position and the shutters to fully open position to remove air only from the upper portion of the stable while preventing the flow of air longitudinally from the bottom of the duct, said electrical system being responsive to reversal of temperature to cause corresponding sequential reversal of the aforesaid linked shutter and damper movements.

References Cited in the file of this patent
UNITED STATES PATENTS

| | | |
|---|---|---|
| 1,915,149 | Blackhall et al. | June 20, 1933 |
| 1,924,489 | Ferris | Aug. 29, 1933 |
| 2,005,615 | Ferris | June 18, 1935 |
| 2,236,480 | Loepsinger | Mar. 25, 1941 |
| 2,355,412 | Bird | Aug. 8, 1944 |